US012657397B2

(12) United States Patent　　　　　(10) Patent No.:　US 12,657,397 B2
Nie et al.　　　　　　　　　　　　　　(45) Date of Patent:　Jun. 16, 2026

(54) INTERACTION METHOD AND APPARATUS, COMPUTER DEVICE, AND STORAGE MEDIUM

(71) Applicant: BEIJING ZITIAO NETWORK TECHNOLOGY CO., LTD., Beijing (CN)

(72) Inventors: Huijing Nie, Beijing (CN); Zhiyan Mo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 148 days.

(21) Appl. No.: 18/783,158

(22) Filed: Jul. 24, 2024

(65) Prior Publication Data

US 2025/0117590 A1　　Apr. 10, 2025

(30) Foreign Application Priority Data

Oct. 9, 2023　(CN) .......................... 202311304037.9

(51) Int. Cl.
| | |
|---|---|
| *G06F 40/35* | (2020.01) |
| *G06F 9/451* | (2018.01) |
| *G06F 16/3329* | (2025.01) |
| *G10L 13/027* | (2013.01) |
| *G10L 13/033* | (2013.01) |
| *G10L 13/08* | (2013.01) |

(52) U.S. Cl.
CPC .......... *G06F 40/35* (2020.01); *G06F 16/3329* (2019.01); *G10L 13/033* (2013.01); *G10L 13/08* (2013.01)

(58) Field of Classification Search
CPC .... G06F 40/35; G06F 16/3329; G06F 49/451; G06F 40/30; G10L 13/033; G10L 13/08; G10L 13/027
USPC .............................. 704/9, 231, 232, 239, 251
See application file for complete search history.

(56) References Cited

U.S. PATENT DOCUMENTS

2023/0244878 A1* 8/2023 Zhao ..................... G06F 40/279
704/9

* cited by examiner

*Primary Examiner* — George C Monikang
(74) *Attorney, Agent, or Firm* — BakerHostetler

(57) ABSTRACT

The present disclosure provides an interaction method and apparatus, a computer device, and a storage medium. The interaction method includes: in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character; and in response to receiving a first question input on the dialog page, obtaining and displaying a first answer result of the target character, wherein the first answer result is generated and obtained based on the target character model, and the first answer result matches the text comprehension information in the plurality of text comprehension dimensions.

20 Claims, 4 Drawing Sheets in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character — S101 in response to receiving a first question input on the dialog page, obtaining and displaying a first answer result of the target character, the first answer result being generated and obtained based on the target character model, and the first answer result matches the text comprehension information in the plurality of text comprehension dimensions — S102

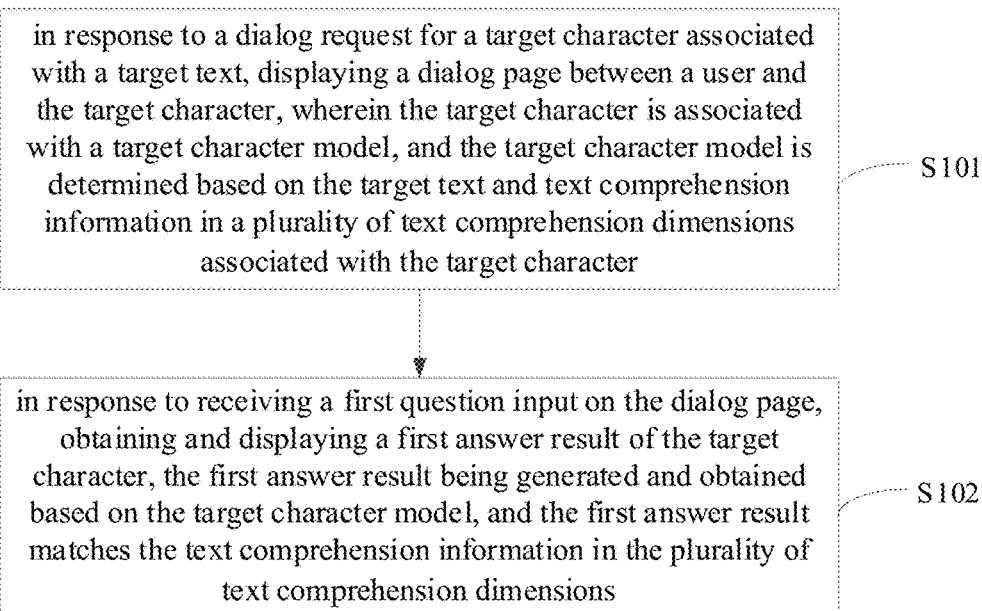

in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character

S101 in response to receiving a first question input on the dialog page, obtaining and displaying a first answer result of the target character, the first answer result being generated and obtained based on the target character model, and the first answer result matches the text comprehension information in the plurality of text comprehension dimensions

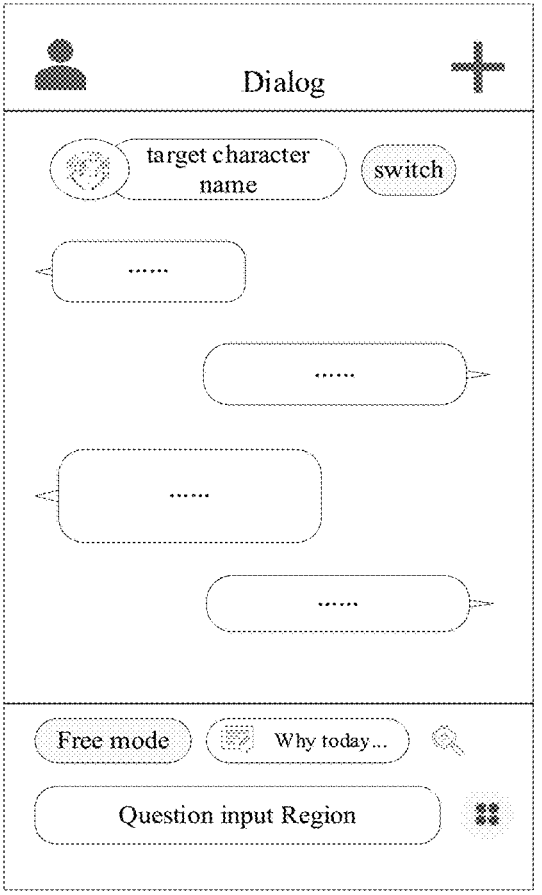

Fig. 2a

INTERACTION METHOD AND APPARATUS, COMPUTER DEVICE, AND STORAGE MEDIUM

CROSS-REFERENCE TO RELATED APPLICATION

This application claims priority to Chinese Patent Application No. 202311304037.9, filed on Oct. 9, 2023, which is incorporated herein by reference in its entirety as a part of this application.

TECHNICAL FIELD

The present disclosure relates to an interaction method and apparatus, a computer device, and a storage medium.

BACKGROUND

Traditional fictional roles exist only in the text and cannot interact with the reader, reducing the user's sense of participation during reading.

With the development of artificial intelligence technologies, it is possible to apply artificial intelligence technology to fiction reading scenarios, such as question-and-answer interactions with artificial intelligence models when the user is reading fiction. However, the artificial intelligence models can generally only provide some mechanistic answers from the perspective of a search engine, resulting in a lack of vividness in the interaction process, and poor interaction experience.

SUMMARY

The embodiment of the disclosure at least provides an interaction method and apparatus, a computer device, and a storage medium.

Embodiments of the present disclosure provide an interaction method, including:

in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character; and in response to receiving a first question input on the dialog page, obtaining and displaying a first answer result of the target character, wherein the first answer result is generated and obtained based on the target character model, and the first answer result matches the text comprehension information in the plurality of text comprehension dimensions.

In an alternative embodiment, after the obtaining a first answer result of the target character, the interaction method further includes:

broadcasting the first answer result in voice according to the timbre feature matching the target character.

In an alternative embodiment, the timbre feature matching the target character is determined by the following steps:

extracting audio data of the target character from an audio file corresponding to the target text; and determining the timbre feature of the target character based on the audio data of the target character.

In an alternative embodiment, the plurality of text comprehension dimensions comprise a character portrait dimension, and text comprehension information in the character portrait dimension includes character attribute information; and the timbre feature matching the target character is determined by the following steps:

determining the timbre feature of the target character based on the character attribute information of the target character in the target text.

In an alternative embodiment, in response to the first answer result being story creation content associated with the target text, after displaying the first answer result of the target character, further including:

obtaining target creation content, wherein self-created content of the user that is determined is taken as the target creation content, or in response to the first answer result comprising a plurality of result options, a target option selected by a user from the plurality of result options is taken as the target creation content;

in response to receiving a second question from the user, obtaining and displaying a second answer result of the target character, wherein the second answer result is generated and obtained based on the target character model, and the second answer result matches the target text and the target creation content.

In an alternative embodiment, the target character model is determined by following steps:

determining the text comprehension information of the target text in the plurality of text comprehension dimensions associated with the target character based on the target text; and obtaining the target character model through training based on historical search question-and-answer data associated with the target text and the text comprehension information.

In an alternative embodiment, the obtaining the target character model through training based on historical search question-and-answer data associated with the target text and the text comprehension information, includes:

obtaining an initial character model through training based on the historical search question-and-answer data associated with the target text and the text comprehension information;

generating a plurality of groups of first question-and-answer data based on the initial character model;

obtaining a plurality of groups of second question-and-answer data by calibrating the plurality of groups of first question-and-answer data; and training and updating the initial character model based on the plurality of groups of second question-and-answer data, to obtain an updated target character model.

In an alternative embodiment, the plurality of text comprehension dimensions include a character portrait dimension, and text comprehension information in the character portrait dimension includes character attribute information and/or character relationship information; and the character attribute information is used to influence an answer style of an answer result generated by the target character model, and the character relationship information is used to assist the target character model in comprehending a character relationship and a story logic in the target text.

In an alternative embodiment, the plurality of text comprehension dimensions include a plot comprehension dimension, and text comprehension information in the plot comprehension dimension includes each recognized plot associated with the target text and plot type information of each plot; and each plot associated with the target text and the plot type information of each plot are used to assist the target character model in searching for text content to answer a question of the user.

In an alternative embodiment, the plurality of text comprehension dimensions include a dialog comprehension dimension, and text comprehension information in the dialog comprehension dimension includes character information and sentiment information of each dialog in the target text; and the character information and the sentiment information of each dialog in the target text are used to assist the target character model in understanding context semantic information of the target text.

Embodiments of the present disclosure also provide an interaction apparatus, including:

a display module, configured for: in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character;

a generation module, configured for: in response to receiving a first question input on the dialog page, obtaining and displaying a first answer result of the target character, wherein the first answer result is generated and obtained based on the target character model, and the first answer result matches the text comprehension information in the plurality of text comprehension dimensions.

Embodiments of the present disclosure also provide a computer device, including a processor, memory, and a bus, wherein the memory stores machine-readable instructions executable by the processor, and when the computer device runs, the processor communicates with the memory via the bus, the machine-readable instructions, when executed by the processor, cause the computer device to perform the interaction method according to any one of embodiments of the present disclosure.

Embodiments of the present disclosure also provide a c computer-readable storage medium, having a computer program stored thereon, wherein the computer program, when run by a processor, executes the interaction method according to any one of the embodiments of the present disclosure.

For the description of the effects of the above-mentioned interaction apparatus, computer device, and computer-readable medium, please refer to the description of the above-mentioned interactive method, which will not be repeated here.

In order to make the above-described objectives, features, and advantages of the present disclosure more obvious and understandable, preferred embodiments are provided below, and illustrated in detail in conjunction with the accompanying drawings.

BRIEF DESCRIPTION OF DRAWINGS

In order to explain the technical scheme of the embodiment of the present disclosure more clearly, the following will briefly introduce the drawings needed in the embodiment, which are incorporated into and constitute a part of this specification, and together with the specification, they show the embodiment in line with the present disclosure and serve to explain the technical scheme of the present disclosure. It should be understood that the following drawings only show some embodiments of the disclosure, so they should not be regarded as limiting the scope. For ordinary people in the field, other related drawings can be obtained according to these drawings without creative work.

FIG. 1 is a flowchart of an interaction method according to an embodiment of the present disclosure;

FIG. 2a is a schematic diagram of a dialog page in the interaction method according to an embodiment of the present disclosure;

DETAILED DESCRIPTION

Figure 2B:
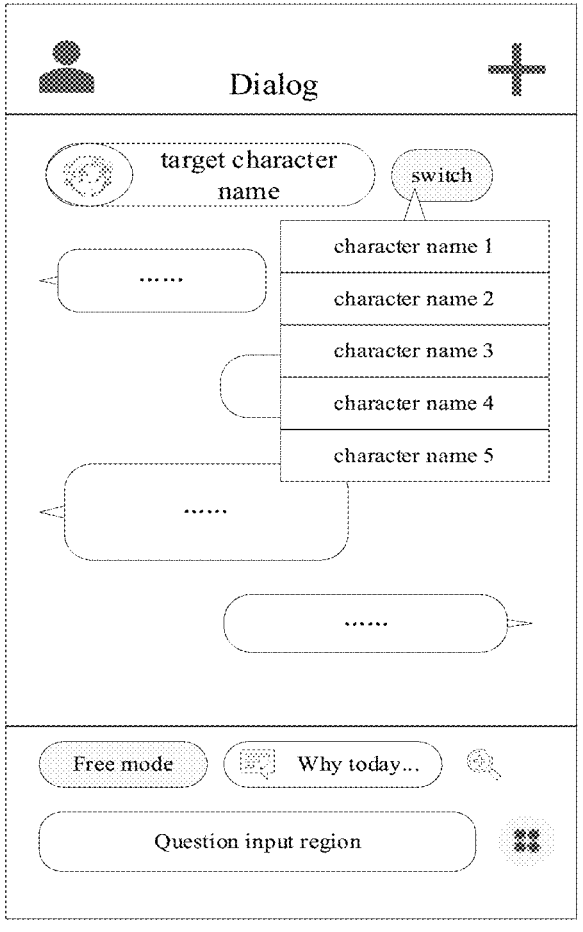
FIG. 2b is a schematic diagram of triggering to switch a target character in a dialog page in the interaction method according to an embodiment of the present disclosure.

To make the purpose, technical scheme, and advantages of the embodiment of the disclosure clearer, the technical scheme in the embodiment of the disclosure will be described clearly and completely in the attached drawings. The described embodiment is only a part of the embodiment of the disclosure, but not the whole embodiment. The components of the embodiments of the present disclosure generally described and illustrated in the drawings herein may be arranged and designed in various configurations. Therefore, the following detailed description of the embodiments of the disclosure provided in the accompanying drawings is not intended to limit the scope of the claimed disclosure but merely represents selected embodiments of the disclosure. Based on the embodiment of the present disclosure, all other embodiments obtained by those skilled in the art without creative work belong to the scope of protection of the present disclosure.

Anthropomorphizing fictional roles is an important trend in the fields of literature, science, and technology. Anthropomorphizing fictional roles can enhance the interactivity of a literary work. Traditional novels are usually a one-way medium for transmitting information, but through anthropomorphized roles, readers can engage in dialogs and interaction with virtual roles, to explore the story world in greater depth, thereby enhancing the sense of engagement and emotional commitment.

Robots generally relying on artificial intelligence models can usually provide only mechanistic dialog modes, lacking personalization and sentiment expression, which limits in-depth interaction between a user and a robot and the interaction experience is not rich enough. In addition, for questions whose answers cannot be directly obtained through searching, answer results provided by the robot usually deviate from the direction of the text description. This stems from a lack of multidimensional text comprehension capabilities for the target text concerned by the user, and this, for example, is equivalent to just mechanistically instilling text content to the robot, and the robot can only search for or piece together an answer when providing the answer result, resulting in unstable quality of the answer result, making it difficult to satisfy expectations of the user.

Based on the foregoing research, an embodiment of the present disclosure provides an interaction method in which a corresponding target character model can be determined based on text comprehension information in a plurality of text comprehension dimensions associated with a target character. To be specific, the target character model is endowed with an anthropomorphic setting of the target character, and the target character model may comprehend the target text from the perspective of the target character, and it may be considered that the target character model determined in this way has personality traits and experiences of the target character, and can give the answer results to the questions from the perspective of the target character. In addition, by endowing the target character model with text comprehension capabilities in the plurality of text comprehension dimensions, the target character model can comprehend text content in depth in the plurality of text comprehension dimensions, to provide richer and in-depth answers from the perspective of the target character, thereby improving interaction quality. For example, the plurality of text comprehension dimensions may include a character portrait dimension, a plot comprehension dimension, and a dialog comprehension dimension, so that the target character model can clearly comprehend attribute features and character relationships of roles involved in the text from the perspective of the target character, comprehend various stories occurring in the text, and comprehend context information of each dialog involved in the text. On this basis, more accurate and vividly anthropomorphic answer results can be provided with reference to the text content of the target text.

The defects that exist in the foregoing scheme and the proposed solutions are all results of the inventor's practice and careful study. Therefore, the process of discovery of the foregoing problems and the solutions proposed in the present disclosure hereinafter for the foregoing problems should be the inventor's contribution to the present disclosure in the process of the present disclosure.

The following clearly and completely describes the technical solutions of the present disclosure with reference to the accompanying drawings in the present disclosure. Apparently, the described embodiments are merely some rather than all of the embodiments of the present disclosure. The components in the present disclosure described and shown in the accompanying drawings herein may be usually arranged and designed in a variety of different configurations. Therefore, the following detailed descriptions of embodiments of the present disclosure provided in the accompanying drawings are not intended to limit the scope of the present disclosure for which protection is claimed but rather represent only selected embodiments of the present disclosure. Based on embodiments of the present disclosure, all other embodiments obtained by a person skilled in the art without creative efforts fall within the protection scope of the present disclosure.

It should be noted that similar reference numerals and letters indicate similar items in the following accompanying drawings so that once an item is defined in one accompanying drawing, it does not need to be further defined and explained in subsequent accompanying drawings.

To facilitate the understanding of this embodiment, an interaction method disclosed in this embodiment of the present disclosure is first described in detail, and an execution body of the interaction method provided in this embodiment of the present disclosure is generally a computer device having a particular computing capability. The computer device includes, for example, a terminal device, a server, or another processing device, and the terminal device may be a user equipment (User Equipment (User Equipment, UE), a mobile device, a user terminal, a terminal, a cellular telephone, a cordless telephone, a personal digital assistant (Personal Digital Assistant, PDA), a handheld device, a computing device, a vehicle-mounted device, a wearable device, or the like. In some possible implementations, the interaction method may be implemented by a processor by invoking a computer-readable instruction stored in memory.

The following describes, by using an example in which the execution body is a terminal, the interaction method provided in embodiments of the present disclosure.

FIG. 1 is a flowchart of an interaction method according to an embodiment of the present disclosure. The method includes steps S101 and S102.

S101: in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character.

In this embodiment of the present disclosure, the user may initiate a dialog request for the target character at any page entry associated with the target text and/or the target character. For example, the user may trigger the dialog request for the target character when reading the target text or may trigger the dialog request for the target character on a character list page.

For example, in the process of reading the target text, the user may have a requirement to engage in a dialog with a particular target character involved in the target text. In this case, the user may trigger a request to engage in a dialog with the target character. Specifically, at least one role identifier associated with the reading page, the reading chapter, or the target text may be displayed in the reading page of the target text, and the user may trigger the role identifier to initiate a dialog request for the target character corresponding to the role identifier. Specifically, the at least one role identifier may be displayed after the user triggers a dialog identifier in the reading page, or when there are a small number of role identifiers, the role identifiers may be directly displayed on the reading page in an arranged manner.

After initiating the dialog request, the user may perform question-and-answer interaction with the target character on the dialog page with the target character. Question information sent by the user may be content associated with the target character per se or content associated with other characters, and in response to the question information of the user, the target character model gives a corresponding answer result from the perspective of the target character. For example, if the user initiates the question "When was the last time a role B appeared" for a target character A, the character A may answer "The last time I saw the role B was at ZZ's home, but I heard that she went to XX's home the last time".

Herein, the target character is associated with the target character model, the target character model is determined based on the target text and the text comprehension information in the plurality of text comprehension dimensions associated with the target character. To be specific, the text comprehension information of the target text in the plurality of text comprehension dimensions, as well as character setting information of the target character, are endowed to the target character model. The target character model is determined based on its own role setting and can interpret the text comprehension information in the plurality of text comprehension dimensions from the perspective of the target character, to form multidimensional text comprehension capability from the perspective of the target character.

FIG. 2a is a schematic diagram of a dialog page. The name and the character portrait of the target character selected by a user are displayed on the dialog page, and the user may perform a question-and-answer interaction with the target character on the dialog page. The user portrait may be a character portrait of a target character in a work associated with the target text or may be a character portrait generated according to the character attribute information of the target character.

During specific implementation, if the user has a requirement to replace the target character of a current dialog before the dialog or in the dialog, the user may also trigger a "switch" control beside an example of the target character, to switch the target character. Further, as shown in FIG. 2b, after user triggers the "switch" control, a pop-up window or a pop-up box may be used to display a list of a plurality of characters associated with the target text or the current reading page or reading chapter, and the user may determine the target character by triggering a corresponding character name; moreover, due to the limitation of the size of the pop-up window, when a plurality of existing characters cannot be all displayed in the pop-up window, the user may also view the characters by using swiping and other gestures, to select the target character, with which the user hopes to have a dialog. In addition, the user may also trigger the "switch" button a plurality of times, to switch the currently displayed target characters in a particular order, until the user switches to the target character, with which the user hopes to have a dialog.

It should be noted that, regardless of the manner of switching between the plurality of target characters, the sorting of the plurality of target characters may be performed according to a particular rule. For example, sorting the plurality of target characters according to discussion degrees of a specific platform for the characters in the target text, or according to a quantity of times, frequency, duration, and the like for which the user chooses to have a dialog with the target characters, or according to alphabetical orders of first letters of the character names. This is not specifically limited in this embodiment of the present disclosure.

In addition, the user may further choose, in the dialog page, whether to set a mode of the current dialog with the target character to a free mode. To be specific, the user may have a free dialog with the target character in the dialog page without being limited to some fixed questions or information. Before or during the dialog, if the user does not know what question to send to the target character next, a question prompt information example is also disposed in the dialog page, and the user may further trigger a control in a magnifier form on the right side of the example, to display a plurality of pieces of question prompt information in the dialog page, so that the user can select a question therefrom or send a question set by the user based on the question prompt information. If the user initiates a corresponding question to a particular piece of question prompt information, the question may be triggered to be sent directly to the dialog page of the target character.

As described above, the user may input the content of the dialog to the target character in the question input region of the dialog page. In addition, if the user has a requirement to send information in a format other than text information, the user may further trigger an identifier on the right side of the question input region to input information in a form such as voice, an emoticon image, or the like.

In the foregoing description, it has been described that the answer result of the target character is also output by the target character model, the target character model is determined based on the target text and the text comprehension information in the plurality of text comprehension dimensions associated with the target character. To be specific, when training the target character model, not only a specific character setting is provided, but also comprehension of the character model for the target text can be strengthened by providing the text comprehension information in the plurality of text comprehension dimensions.

During specific implementation, determining the text comprehension information of the target text in the plurality of text comprehension dimensions associated with the target character based on the target text, and then obtaining the target character model through training based on historical search question-and-answer data associated with the target text and the text comprehension information.

Herein, the text comprehension information in the plurality of text comprehension dimensions associated with the target character may be obtained through semantic comprehension of the target text from the plurality of text comprehension dimensions through a semantic comprehension model, or the text comprehension information may be first comprehended through the semantic comprehension model, and then the obtained text comprehension information is calibrated through manual annotation. Because a language model usually has some difficulties in in-depth comprehension of longer texts (for example, exceeding a particular number of characters), can understand only the surface meaning of the text, and may finally play the role of only search. To avoid this case, pre-determining the text comprehension information of the target text in the plurality of text comprehension dimensions, and providing the text comprehension information to the language model, so that the language model can easily comprehend, in-depth, information of the target text in the plurality of dimensions, thereby laying a better foundation for the subsequent provision of the answer result.

In addition, the historical search question-and-answer data associated with the target text reflects, to some extent, question-and-answer hotspots of the target text and a result detection that meets the requirement of the user, and this is used as a sample for the training of the target character model. In this way, the answer result output by the target character model can better meet the question-and-answer intention of the user, and the target character model can better learn the capability of mastering and comprehending the intention of the user.

Therefore, the text comprehension information and the historical search question-and-answer data that is collected through searching and associated with the target text are used as training data, which is input into the language model, and a setting of the target character is provided, to obtain, through training, the target character model that can accurately comprehend the target text from the plurality of dimensions, can accurately comprehend the intention of the question of the user, and can provide the answer result from the perspective the target character.

In this embodiment of the present disclosure, an initial character model may be first obtained through training based on the text comprehension information and the historical search question-and-answer data associated with the target text, and then a plurality of groups of first question-and-answer data are constructed by using the initial character model, and the obtained plurality of groups of first question-and-answer data are calibrated, to obtain a plurality of groups of second question-and-answer data; and finally, the initial character model is trained and updated based on the plurality of groups of second question-and-answer data, to obtain an updated target character model.

Herein, a plurality of rounds of question-and-answer calibration are performed on the initial character model obtained through training based on the historical search question-and-answer data and the text comprehension information, so that the finally formed target character model can perform more accurate outputting, and can provide the answer result that better meets the intention of the user.

Figure 3:
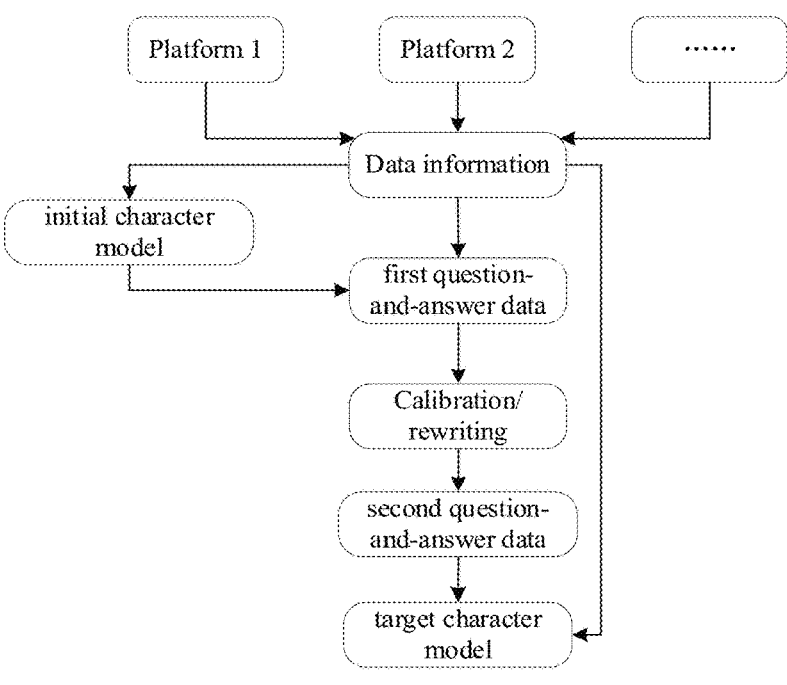
FIG. 3 is a schematic flowchart of obtaining an updated target character model through training in the interaction method according to an embodiment of the present disclosure.

FIG. 3 is a schematic flowchart of obtaining an updated target character model through training. During specific implementation, data information associated with the target text may be first obtained from various platforms, and the data information is used for training to obtain the initial character model; then a series of question information is input into the initial character model to obtain corresponding answering results, to construct a plurality of groups of one-to-one corresponding first question-and-answer data. For the obtained first question-and-answer data, the question information and answer result may deviate from the target text and its associated data information. For example, the question information is "What do you think of the person ?", and the corresponding answer result given by the initial character model may be "He is a good man who is chivalrous and righteous", but in the target text, "" in the question information may be the enemy of the target character corresponding to the initial character model, and therefore the evaluation of the person should not be positive.

Because the question information and the corresponding answer result may deviate from the target text content, the obtained first question-and-answer data may be further calibrated. For example, a target answer result under the corresponding question information may be preset to automatically calibrate and modify the answer result given by the initial character model. Specifically, the answer result given by the initial character model may be matched in similarity with the preset target answer result. If a preset similarity value is reached, the answer result is considered to pass a test, or if the preset similarity value is not reached, the answer result is considered to fail the test. Then, the answer result that fails the test may be modified based on the preset target answer result, and the corresponding question-and-answer data is updated based on the modified answer result, to obtain more accurate second question-and-answer data. For another example, keyword information in the question information may also be identified, and context content that is in the target text and associated with the keyword information is extracted from the target text and its associated data information, to check whether the answer result is in line with the content described in the corresponding context; and for the answer result that differs from the context content of the target text, the answer result may be modified based on the context, to obtain more accurate second question-and-answer data.

It should be noted that the algorithms for similarity matching mentioned in the foregoing possible implementations may be similarity matching algorithms such as a cosine similarity algorithm, an HNSW algorithm (Hierarchical Navigable Small World algorithm), and the like. This is not specifically limited in this embodiment of the present disclosure, provided that the objective thereof can be achieved.

After the updated and more accurate question-and-answer data is obtained, the data may be input into the character model, and trained to obtain the final target character model. Herein, the question-and-answer calibration process may be executed in one or more rounds. During execution in a plurality of rounds, the next round of question-and-answer is executed after calibration and modification are performed after a previous round is executed.

It is mentioned above that the model often has difficulty in comprehending text information. Therefore, in this embodiment of the present disclosure, the target text and its associated data information may be comprehended based on the plurality of text comprehension dimensions, to obtain the text comprehension information in the corresponding plurality of comprehension dimensions, and then the obtained text comprehension information is used as training data of the target character model, so that the target character model can better comprehend the target text, and the target character associated with the target character model is closer to the character itself.

In a specific implementation, the plurality of text comprehension dimensions may include a character portrait dimension, a plot comprehension dimension, and a dialog comprehension dimension. The text comprehension information in the character portrait dimension is provided, for example, the text comprehension information in the character portrait dimension includes the character name, relationships between characters, character attribute descriptions, and the like, so that the target character model can clearly comprehend the features of the various characters and the relationships between the characters involved in the target text from the perspective of the target character, thereby helping to provide answer results that are in line with the features of the characters and the relationships between the characters. The text comprehension information in the plot comprehension dimension is provided, for example, the text comprehension information in the plot comprehension dimension includes the chapter and plot type of each plot involved in the target text, so that the target character model can better locate the plots and more easily grasp the overall story direction of the text. The text comprehension information in the dialog comprehension dimension is provided, for example, the text comprehension information in the dialog comprehension dimension includes dialog character recognition and dialog sentiment recognition, so that the target character model can better understand the characters to which the dialogs in the text belong, and dialog sentiments, so as to more accurately grasp the context information and sentiment directions of the dialogs, thereby providing more accurate answer results according to more accurate sentiment expression styles.

The following separately describes the foregoing text comprehension dimensions.

First, for the character portrait dimension, the text comprehension information in the character portrait dimension includes character attribute information and/or character relationship information, where the character attribute information is used to affect the answer style of an answer result generated by the target character model, and the character relationship information is used to assist the target character model in comprehending a character relationship and a story logic in the target text.

Herein, the character attribute information may include, for example, a character name, a character personality, a character identity, a character appearance, a character fighting force, a character background, and the like, and the character relationship information may be represented in the form of a relationship graph, and the relationship graph may be in a graph form of dispersion from the center to the outside. For example, in descending order of frequencies of occurrence of the characters in the text, a relationship graph between the characters is established in sequence through dispersion from the center to the outside.

During specific implementation, names and aliases of the main characters may be first extracted and sorted according to frequencies of occurrence of the main characters. The main characters herein do not mean protagonists in the target text, but may also include those roles that do not appear frequently, but are important to the story described in the target text or play a particular role in promoting the development of the story. Next, based on the character names and aliases extracted in the foregoing step, character information corresponding to each character may be composed by searching the target text and other information associated with the target text for descriptions in a plurality of aspects such as the personality, identity, background, appearance, and ability of each character. For example, character information for a particular role in the target text may be "Xiaoming/Mingming, optimistic and cheerful, a runner in a pharmacy, is actually the third prince of a neighboring country". It should be noted that the foregoing character description information in the plurality of aspects is only used as an example in this embodiment of the present disclosure, and in practical application, description information for each character in any aspect may be further extracted, and this is not limited in this embodiment of the present disclosure.

In addition, a corresponding character design label may be further output directly based on character information, and a character design label may include gender, age, and personality of a character, for example, "resolute and unyielding young man", "quirky girl", or the like.

Finally, a character relationship between the characters may be recognized according to the target text and other data information associated with the target text, to obtain corresponding character relationship information, where the character relationship information may be a relationship that exists between two character subjects, such as a conjugal relationship or a sister relationship, or may be information that describes a state between the two character subjects, for example, "Role A is pursuing Role B" or "crush", and the like.

Second, for the plot comprehension dimension, the text comprehension information in the plot comprehension dimension includes each recognized plot associated with the target text and the plot type information of each plot, for assisting the target character model in searching for text content for answering a question of the user.

Herein, the plot comprehension dimension may include a plot division sub-dimension and a plot type recognition sub-dimension, and plot division means dividing the target text into a plurality of plot paragraphs according to a plurality of division dimensions, and marking plot types to the plurality of plot paragraphs obtained through the division, to help the target character model to comprehend the content of the plot content more quickly and accurately.

During specific implementation, the chapter text in the target text may be divided into a plurality of plot paragraphs according to dimensions such as time, space, core character, and story change, and each plot paragraph is used as an independent plot. Then, an external model for text comprehension is indicated, according to the story of each plot paragraph, to output a plot label for each plot paragraph, where the plot label may include a background description of the corresponding plot paragraph and a state change of a corresponding character, such as being injured, being in distress, or the like.

Third, for the dialog comprehension dimension, the text comprehension information in the dialog comprehension dimension includes the recognized character information and the sentiment information of each dialog in the target text, to assist the target character model in understanding the context semantic information of the target text.

Herein, the dialog comprehension dimension may include two sub-dimensions: dialog character recognition and dialog sentiment recognition, and by providing dialog comprehension information in these two sub-dimensions, the target character model can be enabled to comprehend and use the content of each dialog more accurately.

During specific implementation, the external model for text comprehension may be indicated to extract each dialog in the target text and determine, according to the context, characters to which each dialog belongs, that is, participants of each dialog; and sentiment expressed in each dialog may be further determined. For example, when a dialog between two characters is "I don't think it's right for you to do this", and according to the context, it may be determined that the background of the current dialog is that the two characters are arguing, and the corresponding sentiment may be disappointment, regret, or the like.

It should be noted that the text comprehension dimension described above is only used as an example in this embodiment of the present disclosure, and the text comprehension dimension may also include any dimension that is not mentioned above, such as an environmental profiling dimension, provided that the objective thereof can be achieved during specific implementation, and this is not limited in this embodiment of the present disclosure.

S102: in response to receiving a first question input on the dialog page, obtaining and displaying a first answer result of the target character, the first answer result being generated and obtained based on the target character model, and the first answer result matches the text comprehension information in the plurality of text comprehension dimensions.

In this step, the user may input the first question on the dialog page of the target character, and the target character model associated with the target character gives the first answer result based on the first question and the text comprehension information in the plurality of text comprehension dimensions, and displays the first answer result in the dialog page.

In this embodiment of the present disclosure, after obtaining the first answer result, the first answer result may be further broadcast in voice according to a timbre feature matching the target character.

In this way, when the user has a dialog with the target character, not only the answer result in line with the style of the target character can be seen, but also a voice broadcasting result in line with the timbre of the target character can be heard, so that the user has an immersive experience, and can actually feel that the user is having a dialog with the target character. In this way, the anthropomorphic experience is more realistic, and the interaction process is more vivid.

During specific implementation, the timbre feature of the target character may be extracted directly from audio data of the target character in an audio work file associated with the target text or may be automatically generated according to the character attributes of the target character. Herein, the audio work file may be obtained through, for example, voice conversion in advance based on a voice synthesis tool (e.g., Text To Speech (TTS)).

For example, if the target text has the form of audio text or other related works including audio data, audio data corresponding to the target character may be extracted from the audio file corresponding to the target text, and then the timbre feature of the target character is determined based on the audio data, and then the timbre feature is fused with the first answer result, to obtain voice broadcasting information that conforms to the timbre feature of the target character.

For another example, the timbre feature of the target character may also be determined based on the character attribute information obtained in S101. During specific implementation, a voice packet that matches the character attribute information of the target character may be selected from an existing voice packet database to determine the timbre feature corresponding to the target character, and a relevant model may be further indicated, based on the character attribute information of the target character, to generate the corresponding timbre feature.

Herein, the character attribute information of the target character, such as age, gender, and personality traits of the character may be used to determine the timbre feature of the target character. For example, the timbre feature of a grandmother is different from that of a young girl, and the timbre feature of a lively and cheerful girl is different from that of a stable and serious girl.

In this embodiment of the present disclosure, the user may also influence the direction of the storyline associated with the text through the selection of different selection branches or settings by the user during the dialog with the target character. To be specific, the dialogue process with the target character may also be used as a text creation process, and the continuation of the creation of the text story is implemented through a plurality of rounds of dialogs.

Specifically, when the first answer result is story creation content associated with the target text, the first answer result obtained according to the first question initiated by the user may include a plurality of result options, and the user may select the target option from the plurality of result options or input the self-created content, and use the target option or the self-created content as the target creation content; and the second answer result subsequently given by the target character model based on the second question initiated by the user is an answer result matching the target text and the target creation content.

During specific implementation, when the first answer result is story creation content associated with the target text, the first answer result provided by the target character model may include a plurality of result options, and the user may select, from the plurality of result options, the target option that the user considers matches the current story, and if no target option meets the user's requirement among the plurality of result options, the user may also input the relevant self-created content, or the user may directly input the self-created content; and then the target option selected by the user or the self-created content is used as the basis for answering the second question initiated by the user, to enable the target character model to generate the second answer result that matches the target option or the self-created content.

Figure 4:
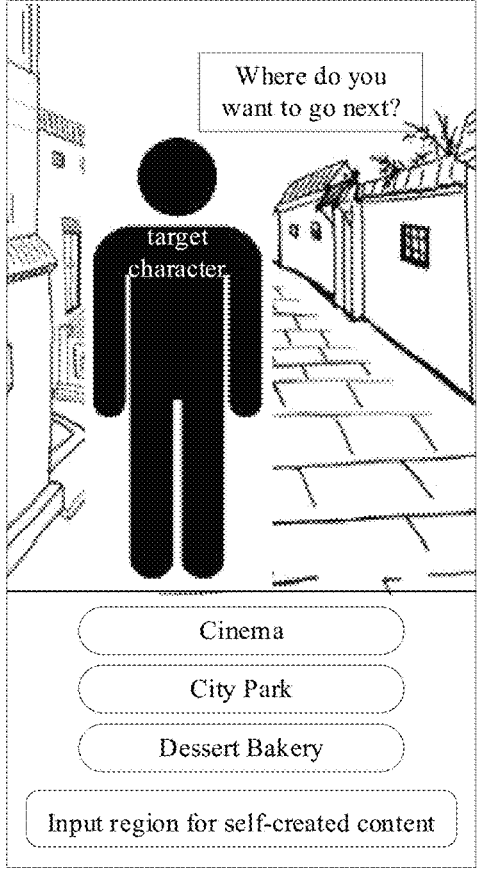
FIG. 4 is a schematic diagram of a target character model application scenario in the interaction method according to an embodiment of the present disclosure.

For example, as shown in FIG. 4, the user is in the process of interacting with the target character, and the target character initiates the question "Where do you want to go next?". At the bottom of the dialog page, there are three answer options: "Cinema", "City Park", and "Dessert Bakery", and the user may trigger any of the three options to determine the target option. In addition, the user may also input self-created content, such as "music studio" and other content that is not included in the plurality of answer options, into the input region below the three answer options. When the user initiates the second question, the target character model may generate the corresponding second answer result based on the target text and the target option that is selected by the user or the self-created content input by the user. The user can not only influence the second answer result through the selection of different selection branches or settings by the user but also influence the direction of the storyline associated with the text.

For example, if the user selects "Cinema" as the target option during the foregoing selection, the subsequent story direction may be watching a movie together with the target character. In addition, when the user initiates the second question "Which one do you like?" in the cinema scenario, the second answer result given by the target character may be "I want to see Titanic" and other answer content related to the "Cinema" option.

For another example, if the user inputs "music studio" in the self-created content input region during the foregoing selection, the subsequent story direction may be performing music performance or creation together with the target character. In addition, when the user initiates the second question "Which one do you like?" in the music studio scenario, the second answer result given by the target character may be "I like the sound of the piano" and other answer content related to the "music studio".

For another example, when the user selects "music studio", the corresponding birthday gift may be a music-related item, such as a musical instrument, a concert ticket, or the like.

A person skilled in the art may understand that, in the foregoing methods of specific implementations, the order in which the steps are written does not mean a strict order of execution and does not constitute any limitation on the implementation process, and the specific order of execution of the steps should be determined by functions and possible internal logic of the steps.

Based on the same inventive concept, an embodiment of the present disclosure further provides an interaction apparatus corresponding to the interaction method. Because the apparatus in this embodiment of the present disclosure resolves the problem in a principle similar to that of the foregoing interaction method in embodiments of the present disclosure, for the implementation of the apparatus, reference may be made to the implementation of the method, and details are not described again.

Figure 5:
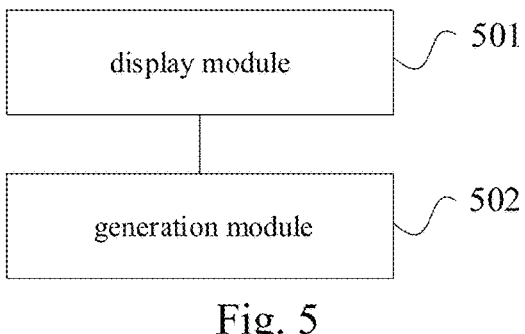
FIG. 5 is a schematic diagram of an interaction apparatus according to an embodiment of the present disclosure.

FIG. 5 is a schematic architectural diagram of an interaction apparatus according to an embodiment of the present disclosure. The apparatus includes: a display module 501 and a generation module 502.

The display module 501 is configured for: in response to a dialog request for a target character associated with a target text, displaying a dialog page between a user and the target character, where the target character is associated with a target character model, and the target character model is determined based on the target text and text comprehension information in a plurality of text comprehension dimensions associated with the target character.

The generation module 502 is configured for: in response to receiving a first question input on the dialog page, obtaining and displaying a first answer result of the target character, wherein the first answer result is generated and obtained based on the target character model, and the first answer result matches the text comprehension information in the plurality of text comprehension dimensions.

In an alternative embodiment, the generation module 502 is specifically configured for:

obtaining a timbre feature matching the target character; broadcasting the first answer result in voice according to the timbre feature matching the target character.

In an alternative embodiment, the generation module 502 is further configured for:

extracting audio data of the target character from an audio file corresponding to the target text; and determining the timbre feature of the target character based on the audio data of the target character.

In an alternative embodiment, the plurality of text comprehension dimensions include a character portrait dimension, and text comprehension information in the character portrait dimension includes character attribute information; and the generation module 502 is further configured for:
determining the timbre feature of the target character based on the character attribute information of the target character in the target text.

In an alternative embodiment, the generation module 502 is specifically configured for:

obtaining target creation content, wherein self-created content of the user that is determined is taken as the target creation content, or in response to the first answer result comprising a plurality of result options, a target option selected by a user from the plurality of result options is taken as the target creation content;

in response to receiving a second question from the user, obtaining and displaying a second answer result of the target character, wherein the second answer result is generated and obtained based on the target character model, and the second answer result matches the target text and the target creation content.

In an alternative embodiment, the display module 501 is further configured for:

determining the text comprehension information of the target text in the plurality of text comprehension dimensions associated with the target character based on the target text; and obtaining the target character model through training based on historical search question-and-answer data associated with the target text and the text comprehension information.

In an alternative embodiment, the display module 501 is specifically configured for:

obtaining an initial character model through training based on the historical search question-and-answer data associated with the target text and the text comprehension information;

generating a plurality of groups of first question-and-answer data based on the initial character model;

obtaining a plurality of groups of second question-and-answer data by calibrating the plurality of groups of first question-and-answer data; and training and updating the initial character model based on the plurality of groups of second question-and-answer data, to obtain an updated target character model.

In an alternative embodiment, the plurality of text comprehension dimensions include a character portrait dimension, and text comprehension information in the character portrait dimension includes character attribute information and/or character relationship information; and the character attribute information is used to influence an answer style of an answer result generated by the target character model, and the character relationship information is used to assist the target character model in comprehending a character relationship and a story logic in the target text.

In an alternative embodiment, the plurality of text comprehension dimensions include a plot comprehension dimension, and text comprehension information in the plot comprehension dimension includes each recognized plot associated with the target text and plot type information of each plot; and each plot associated with the target text and the plot type information of each plot are used to assist the target character model in searching for text content to answer a question of the user.

In an alternative embodiment, the plurality of text comprehension dimensions include a dialog comprehension dimension, and text comprehension information in the dialog comprehension dimension includes character information and sentiment information of each dialog in the target text; and the character information and the sentiment information of each dialog in the target text are used to assist the target character model in understanding context semantic information of the target text.

Reference may be made to related descriptions in the foregoing method embodiment for descriptions of processing procedures of the modules in the apparatus, and procedures of interactions between the modules.

Figure 6:
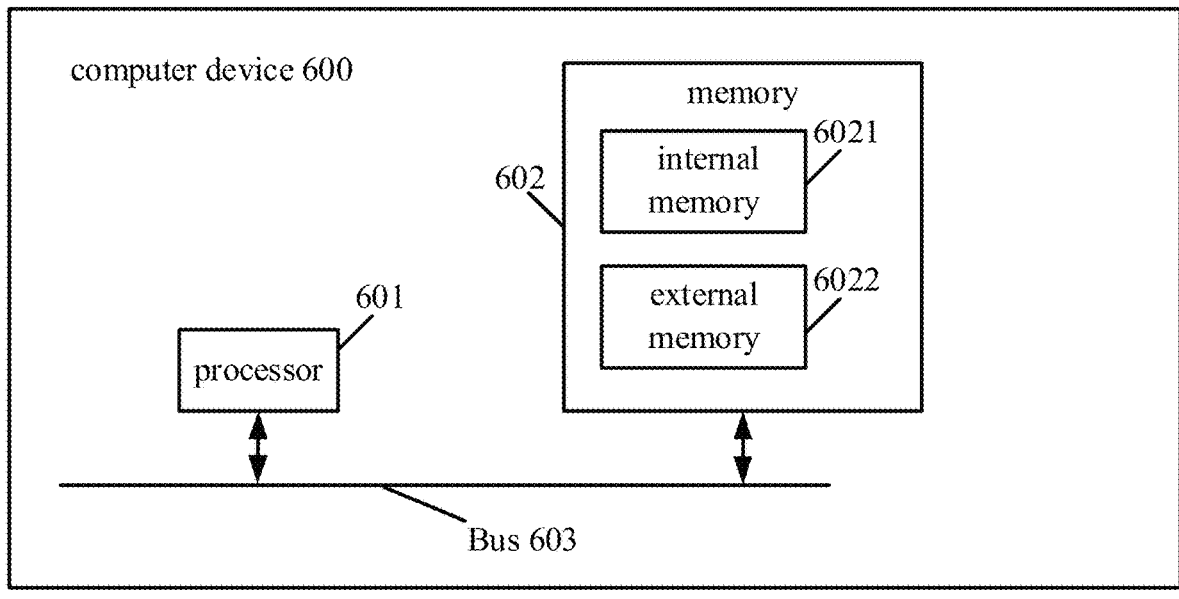
FIG. 6 is a schematic diagram of a computer device according to an embodiment of the present disclosure.

Corresponding to the interaction method in FIG. 1, an embodiment of the present disclosure further provides a computer device 600. FIG. 6 is a schematic structural diagram of a computer device 600 according to an embodiment of the present disclosure. The computer device 600 includes:

a processor 601, a memory 602, and a bus 603. The memory 602 is configured to store an execution instruction and includes an internal memory 6021 and an external memory 6022. The internal memory 6021 herein is also referred to as an internal storage and is configured to temporarily store operational data in the processor 601, and data exchanged with the external memory 6022 such as a hard disk. The processor 601 exchanges data with the external memory 6022 by using the internal memory 6021. When the computer device 600 runs, the processor 601 communicates with the memory 602 through the bus 603, so that the processor 601 executes the following instruction:

in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character; and in response to receiving a first question input on the dialog page, obtaining and displaying a first answer result of the target character, wherein the first answer result is generated and obtained based on the target character model, and the first answer result matches the text comprehension information in the plurality of text comprehension dimensions.

An embodiment of the present disclosure further provides a computer-readable storage medium, where the computer-readable storage medium stores a computer program, and when the computer program is run by a processor, the steps of the interaction method in the forgoing method embodiments are performed. The storage medium may be a volatile or non-volatile computer-readable storage medium.

An embodiment of the present disclosure further provides a computer program product. The computer program product carries program code. Instructions included in the program code may be used to perform the steps of the interaction method in the foregoing method embodiments. Reference may be made to the foregoing method embodiments for details. Details are not described herein again.

The computer program product may be realized specifically by means of hardware, software or a combination thereof. In an optional embodiment, the computer program product is specifically embodied as a computer storage medium, and in another optional embodiment, the computer program product is specifically embodied as a software product, such as a software development kit (Software Development Kit, SDK) or the like.

It may be clearly understood by a person skilled in the art that, for the purpose of convenient and brief description, for a detailed working process of the system and apparatus described above, reference may be made to a corresponding process in the foregoing method embodiments. Details are not described herein again. In several embodiments provided in the present disclosure, it should be understood that the disclosed system, apparatus, and method may be implemented in another manner. The apparatus embodiments described above are merely examples. For example, division into the modules is merely logic function division and may be other division in actual implementation. For another example, a plurality of modules or components may be combined or integrated into another system, or some features may be ignored or not performed. In addition, the displayed or discussed mutual couplings or direct couplings or communication connections may be implemented by using some communication interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected based on actual requirements, to achieve the objective of the solution of this embodiment.

In addition, functional modules in embodiments of the present disclosure may be integrated into one processing module, each of the modules may exist alone physically, or two or more modules may be integrated into one module.

When the functions are implemented in the form of a software functional module and sold or used as an independent product, the functions may be stored in a nonvolatile computer-readable storage medium that can be executed by a processor. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of the present disclosure. The foregoing storage medium includes: any medium that can store program code, for example, a USB flash drive, a removable hard disk, a read-only memory (Read-Only Memory, ROM), a random-access memory (Random Access Memory, RAM), a magnetic disk, or an optical disc.

Finally, it should be explained that the above-mentioned embodiments are only specific embodiments of this disclosure, which are used to illustrate the technical scheme of this disclosure, but not to limit it. The protection scope of this disclosure is not limited to this. Although this disclosure has been described in detail with reference to the above-mentioned embodiments, it should be understood by ordinary people in the field that any person familiar with this technology can still modify or modify the technical scheme recorded in the above-mentioned embodiments within the technical scope disclosed in this disclosure. However, these modifications, changes or substitutions do not make the essence of the corresponding technical scheme deviate from the spirit and scope of the technical scheme of the embodiment of this disclosure and should be included in the protection scope of this disclosure. Therefore, the scope of protection of this disclosure should be based on the scope of protection of the claims.

The invention claimed is:

1. An interaction method, comprising:
in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character; and
in response to receiving a first question input on the dialog page, obtaining and displaying a first answer result of the target character, wherein the first answer result is generated and obtained based on the target character model, and the first answer result matches the text comprehension information in the plurality of text comprehension dimensions.

2. The method according to claim 1, wherein after the obtaining a first answer result of the target character, the interaction method further comprises:
obtaining a timbre feature matching the target character;
broadcasting the first answer result in voice according to the timbre feature matching the target character.

3. The method according to claim 2, wherein the obtaining a timbre feature matching the target character, comprises:
extracting audio data of the target character from an audio file corresponding to the target text; and
determining the timbre feature of the target character based on the audio data of the target character.

4. The method according to claim 2, wherein the plurality of text comprehension dimensions comprise a character portrait dimension, and text comprehension information in the character portrait dimension comprises character attribute information; and
the obtaining a timbre feature matching the target character, comprises:
determining the timbre feature of the target character based on the character attribute information of the target character in the target text.

5. The method according to claim 1, wherein, in response to the first answer result being story creation content associated with the target text, after displaying the first answer result of the target character, the method further comprises:
obtaining target creation content, wherein self-created content of the user that is determined is taken as the target creation content, or in response to the first answer result comprising a plurality of result options, a target option selected by a user from the plurality of result options is taken as the target creation content;

in response to receiving a second question from the user, obtaining and displaying a second answer result of the target character, wherein the second answer result is generated and obtained based on the target character model, and the second answer result matches the target text and the target creation content.

6. The method according to claim 1, wherein determining the target character model, comprises:

determining the text comprehension information of the target text in the plurality of text comprehension dimensions associated with the target character based on the target text; and obtaining the target character model through training based on historical search question-and-answer data associated with the target text and the text comprehension information.

7. The method according to claim 6, wherein the obtaining the target character model through training based on historical search question-and-answer data associated with the target text and the text comprehension information, comprises:

obtaining an initial character model through training based on the historical search question-and-answer data associated with the target text and the text comprehension information;

generating a plurality of groups of first question-and-answer data based on the initial character model;

obtaining a plurality of groups of second question-and-answer data by calibrating the plurality of groups of first question-and-answer data; and training and updating the initial character model based on the plurality of groups of second question-and-answer data, to obtain an updated target character model.

8. The method according to claim 1, wherein the plurality of text comprehension dimensions comprise a character portrait dimension, and text comprehension information in the character portrait dimension comprises character attribute information and/or character relationship information; and the character attribute information is used to influence an answer style of an answer result generated by the target character model, and the character relationship information is used to assist the target character model in comprehending a character relationship and a story logic in the target text.

9. The method according to claim 1, wherein the plurality of text comprehension dimensions comprise a plot comprehension dimension, and text comprehension information in the plot comprehension dimension comprises each recognized plot associated with the target text and plot type information of each plot; and each plot associated with the target text and the plot type information of each plot are used to assist the target character model in searching for text content to answer a question of the user.

10. The method according to claim 1, wherein the plurality of text comprehension dimensions comprise a dialog comprehension dimension, and text comprehension information in the dialog comprehension dimension comprises character information and sentiment information of each dialog in the target text; and the character information and the sentiment information of each dialog in the target text are used to assist the target character model in understanding context semantic information of the target text.

11. A computer device, comprising: a processor, memory, and a bus, wherein the memory stores machine-readable instructions executable by the processor, and when the computer device runs, the processor communicates with the memory via the bus, the machine-readable instructions, when executed by the processor, cause the computer device to perform an interaction method, the interaction method comprises:

in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character; and in response to receiving a first question input on the dialog page, obtaining and displaying a first answer result of the target character, wherein the first answer result is generated and obtained based on the target character model, and the first answer result matches the text comprehension information in the plurality of text comprehension dimensions.

12. The computer device according to claim 11, wherein the machine-readable instructions, when executed by the processor, further cause the computer device to:

obtain a timbre feature matching the target character;

broadcast the first answer result in voice according to the timbre feature matching the target character.

13. The computer device according to claim 12, wherein the obtaining a timbre feature matching the target character, comprises:

extracting audio data of the target character from an audio file corresponding to the target text; and determining the timbre feature of the target character based on the audio data of the target character.

14. The computer device according to claim 12, wherein the plurality of text comprehension dimensions comprise a character portrait dimension, and text comprehension information in the character portrait dimension comprises character attribute information; and the obtaining a timbre feature matching the target character, comprises:

determining the timbre feature of the target character based on the character attribute information of the target character in the target text.

15. The computer device according to claim 11, wherein, in response to the first answer result being story creation content associated with the target text, the machine-readable instructions, when executed by the processor, further cause the computer device to:

obtain target creation content, wherein self-created content of the user that is determined is taken as the target creation content, or in response to the first answer result comprising a plurality of result options, a target option selected by a user from the plurality of result options is taken as the target creation content;

in response to receiving a second question from the user, obtain and display a second answer result of the target character, wherein the second answer result is generated and obtained based on the target character model, and the second answer result matches the target text and the target creation content.

16. The computer device according to claim 11, wherein determining the target character model, comprises:

determining the text comprehension information of the target text in the plurality of text comprehension dimensions associated with the target character based on the target text; and obtaining the target character model through training based on historical search question-and-answer data associated with the target text and the text comprehension information.

17. The computer device according to claim 11, wherein the plurality of text comprehension dimensions comprise a character portrait dimension, and text comprehension information in the character portrait dimension comprises character attribute information and/or character relationship information; and the character attribute information is used to influence an answer style of an answer result generated by the target character model, and the character relationship information is used to assist the target character model in comprehending a character relationship and a story logic in the target text.

18. The computer device according to claim 11, wherein the plurality of text comprehension dimensions comprise a plot comprehension dimension, and text comprehension information in the plot comprehension dimension comprises each recognized plot associated with the target text and plot type information of each plot; and each plot associated with the target text and the plot type information of each plot are used to assist the target character model in searching for text content to answer a question of the user.

19. The computer device according to claim 11, wherein the plurality of text comprehension dimensions comprise a dialog comprehension dimension, and text comprehension information in the dialog comprehension dimension comprises character information and sentiment information of each dialog in the target text; and the character information and the sentiment information of each dialog in the target text are used to assist the target character model in understanding context semantic information of the target text.

20. A non-transitory computer-readable storage medium, having a computer program stored thereon, wherein the computer program, when run by a processor, executes an interaction method, the interaction method comprises:

in response to a dialog request for a target character associated with a target text, displaying a dialog page between a user and the target character, wherein the target character is associated with a target character model, and the target character model is determined based on the target text and text comprehension information in a plurality of text comprehension dimensions associated with the target character; and in response to receiving a first question input on the dialog page, obtaining and displaying a first answer result of the target character, wherein the first answer result is generated and obtained based on the target character model, and the first answer result matches the text comprehension information in the plurality of text comprehension dimensions.

\* \* \* \* \*